(12) United States Patent
Wheelock

(10) Patent No.: US 8,312,488 B2
(45) Date of Patent: Nov. 13, 2012

(54) METHOD AND SYSTEM FOR FAST CHANNEL CHANGE IN A COMMUNICATION DEVICE

(75) Inventor: Ian Wheelock, Cork (IE)

(73) Assignee: ARRIS Group, Inc., Suwanee, GA (US)

( * ) Notice: Subject to any disclaimer, the term of this patent is extended or adjusted under 35 U.S.C. 154(b) by 877 days.

(21) Appl. No.: 11/680,493

(22) Filed: Feb. 28, 2007

(65) Prior Publication Data

US 2007/0204312 A1    Aug. 30, 2007

Related U.S. Application Data

(60) Provisional application No. 60/777,399, filed on Feb. 28, 2006.

(51) Int. Cl.
*G06F 3/00* (2006.01)
*G06F 13/00* (2006.01)
*H04N 5/445* (2011.01)

(52) U.S. Cl. ............................ 725/38; 725/131; 725/134

(58) Field of Classification Search .................. 725/111, 725/38
See application file for complete search history.

(56) References Cited

U.S. PATENT DOCUMENTS

| | | | |
|---|---|---|---|
| 3,914,534 A * | 10/1975 | Forbes | 380/220 |
| 5,557,724 A * | 9/1996 | Sampat et al. | 725/43 |
| 6,049,831 A * | 4/2000 | Gardell et al. | 709/236 |
| 6,208,384 B1 * | 3/2001 | Schultheiss | 348/552 |
| 6,621,528 B1 * | 9/2003 | Kessler et al. | 348/734 |
| 2001/0032333 A1 * | 10/2001 | Flickinger | 725/39 |
| 2004/0034864 A1 * | 2/2004 | Barrett et al. | 725/38 |
| 2004/0194147 A1 * | 9/2004 | Craven et al. | 725/111 |
| 2005/0183130 A1 * | 8/2005 | Sadja et al. | 725/107 |
| 2008/0046952 A1 * | 2/2008 | Denney et al. | 725/125 |

* cited by examiner

Primary Examiner — Robert Hance
(74) Attorney, Agent, or Firm — Troy A. Van Aacken; Robert J. Starr

(57) ABSTRACT

A stream request is generated based on the stream address of a corresponding program selected from an electronic program guide that associates programs with corresponding IP multicast stream addresses by a subscriber/user device. The stream request is sent from the subscriber device to a broadband device, which compares the address in the request to available stream information listed in a content guide. The content guide contains information for all multicast streams that are available from a CMTS to the broadband device over DS channels of the current MAC domain. The broadband device locks to the stream that corresponds to the request, including tuning to a different DS channel if necessary. The broadband device may request another MAC domain if the stream is not available from the current one. After locking to a desired stream, the broadband device informs the CMTS so that it can adjust content guide user counts.

20 Claims, 4 Drawing Sheets

| IP Multicast Details (ASM/SSM) | DS Chan ID | DS Params | PHS/BPI | User_count | Reserved |
|---|---|---|---|---|---|
| 192.168.1.1/232.1.1.1 | 2 | DS Params | PHS/BPI | 150 | Reserved |
| 192.168.1.1/232.1.1.1 | 4 | DS Params | PHS/BPI | 100 | Reserved |
| 176.23.12.14/232.32.23.109 | 2 | DS Params | PHS/BPI | 75 | Reserved |
|  |  |  |  |  |  |
|  | 2 |  |  |  |  |

FIG. 4

METHOD AND SYSTEM FOR FAST CHANNEL CHANGE IN A COMMUNICATION DEVICE

CROSS REFERENCE TO RELATED APPLICATION

This application claims priority under 35 U.S.C. 119(e) to U.S. provisional patent application Ser. No. 60/777,399 entitled "DOCSIS fast channel change," which was filed Feb. 28, 2006, and which is incorporated herein by reference in its entirety.

FIELD OF THE INVENTION

The present invention relates generally to communication signals transmitted over a network.

BACKGROUND

Community antenna television ("CATV") networks have been used for more then four decades to deliver television programming to a large number of subscribers. Increasingly, CATV networks are used by providers to provide data services to subscribers. For example, cable modems used in a broadband cable modem termination system ("CMTS") compete with digital subscriber lines ("DSL") and DSL modems used therein, which are typically implemented and supported by telephone companies. DSL service is typically provided over the same wires as a residence's telephone service.

In the cable distribution context, a CMTS typically transmits downstream data to a broadband device, typically a cable modem ("CM"). The data sent to a CM can include packets containing voice call information, internet data, or video content, for examples. In the scenario where a program (audio or video) is transmitted downstream from the CMTS to a CM, multiple content streams may be served by multiple downstream channels within a media access control ("MAC") domains. Different MAC domains may be located at the same service provider head end, or may be geographically spread amount multiple head end locations.

When a user is receiving a program (audio or video) and wishes to change to a different program, the user typically causes a set top box, or such similar subscriber device, to request a different content stream that corresponds to the new program the subscriber wishes to receive. The subscriber device typically uses IP multicast signaling protocols, such as IGMP or MLD, to request the content stream. The subscriber device only has knowledge of the content stream identifier, typically an IP multicast address (ASM/SSM), and is not provided details of whether the content stream is currently being forwarded by the CMTS or on what downstream channel, within the set of downstream channels the CMTS controls within the DOCSIS MAC domain, it may currently be available on. The CMTS receives the IGMP/MLD request. The CMTS controls the content streams that are delivered to subscriber devices and downstream channels that are used for delivery. If a content stream is not presently available from the CMTS, the CMTS requests the content stream. The CMTS decides what downstream channel to deliver the content on based on available bandwidth or some other form of policy settings configured on the CMTS. In addition, the requested content stream may already exist on one of the downstream channels. In either case, once the downstream channel is identified by the CMTS, and the subscriber device is identified as being on a different downstream channel, the CMTS invokes the DCC procedure to move the subscriber device to the correct downstream channel. This results in the subscriber device performing a CMTS-driven re-tune of its downstream channel in order to receive the requested content stream. The DCC procedure uses a somewhat complicated and involved process for signaling intention of channel change, waiting for the channel change to occur, followed by acknowledgement of the channel change. A number of re-initialization techniques are available to DCC to ensure that the subscriber device can be successfully readmitted to the DOCSIS MAC domain, without causing interruption to the subscriber device or other subscriber devices in the network. The selection of some of these techniques can induce a time delay that impact the subscriber device to quickly access the content stream that was requested in the first place. The DCC procedure, due to its complexity, ties up resources on the CMTS and may be limited, depending on the CMTS architecture, to a possibly low number of concurrent transactions per second.

The DCC process can take a long time relative to the amount of time a user may be used to in changing television stations between two analog-delivered channels. This time delay can be annoying and tarnish a viewers experience in using his or her television, or other similar video monitor device. The DCC process can also increase the amount of interactivity between subscriber devices and the CMTS, leading to an increase in upstream bandwidth usage as well as increasing the processing demands of the CMTS.

Thus, there is a need in the art for method for facilitating the changing of channels delivering different video content that reduces the amount of time between channel changes when the different program channels are served by different downstream channels within DOCSIS MAC domains.

Information regarding multiple content streams delivered from a given MAC domain is typically not provided to a CM. Delay exists when accessing content from different downstream channels from the same MAC domain. The delay occurs when the CM requests a content stream and waits for the CMTS to either deliver the new content stream on the currently tuned downstream channel, or, by using DCC, change to the downstream channel the content stream already exists on before a user can access the required program stream. Thus, there is a need in the art for reducing the time between accessing programs streams that are delivered within the same MAC domain but on different downstream channels.

BRIEF DESCRIPTION OF THE DRAWINGS

FIG. 4 illustrates information included in a content guide.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. This disclosure is not intended nor is to be construed to limit the present invention or otherwise to exclude other embodiments, adaptations, variations, modifications and equivalent arrangements, the present invention being limited only by the claims appended hereto and the equivalents thereof.

Figure 1:
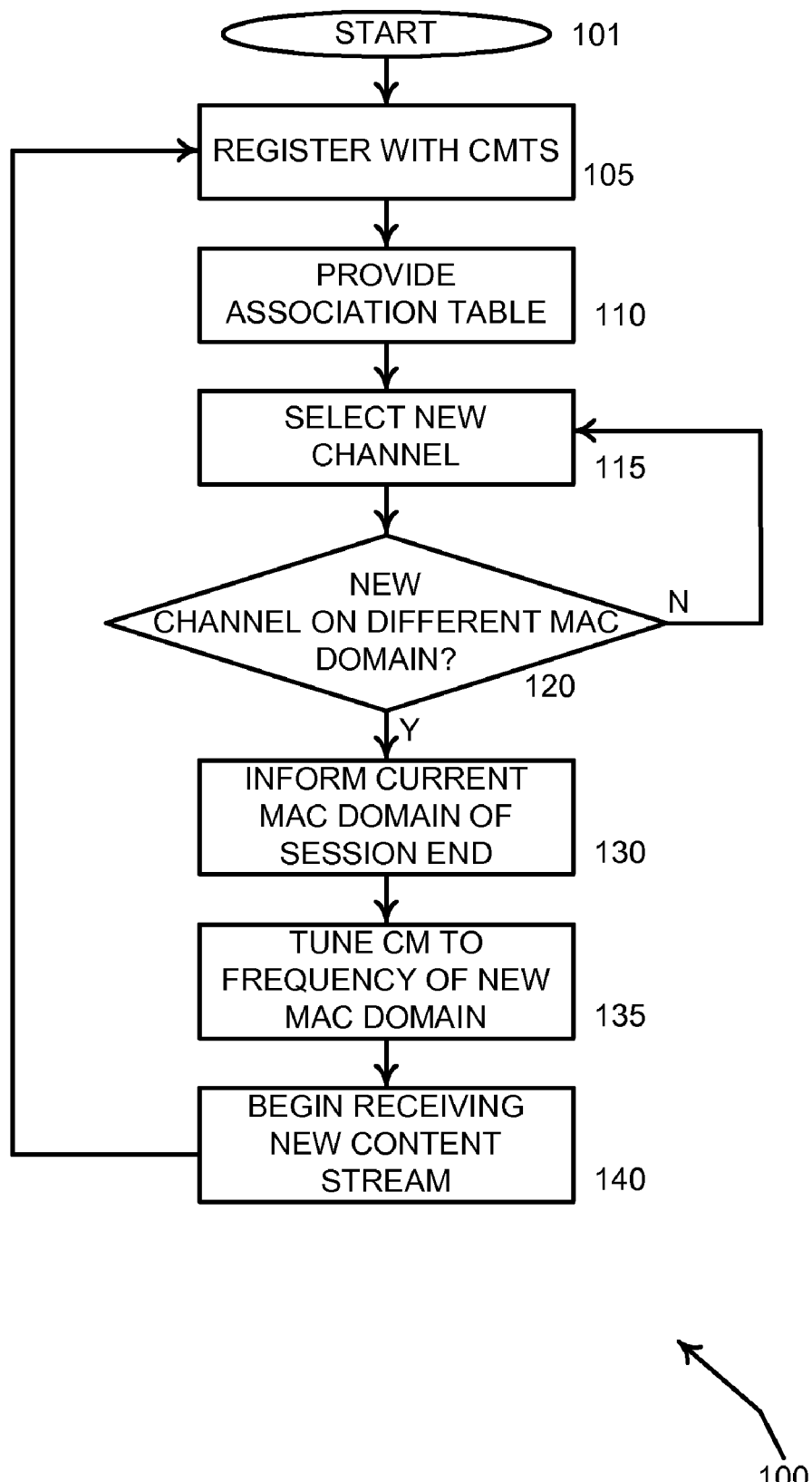
FIG. 1 illustrates a flow diagram of a method for facilitating fast channel change.

Turning now to FIG. 1, a flow diagram of a method 100 for facilitating fast channel change is shown. Method 100 starts at step 101. A user/subscriber device, such as, for example, a cable modem ("CM") used to receive downstream video content from a cable modem termination system ("CMTS") registers at step 105 with the CMTS according to processes known in the art. The registration process 105 establishes a session between the downstream media access control ("MAC") domain of the CMTS and the CM. Registration provides the CMTS with information regarding the CM so bandwidth may be allocated properly to the CM and other CMs currently registered.

In an aspect, an association table is provided to the CM after registration at step 110. The association table may be generated at a service provider's head end, or another central location operated by the service provider. The latter may be preferable if multiple CMTSs spread across multiple physical locations are used to provide content to subscribers. The association table includes program identifiers that correspond to programs to which a subscriber/viewer may be granted access. The program identifiers are associated with downstream channel frequency. The downstream channel frequency is typically a center frequency of a QAM channel used to deliver data and multimedia content, as known in the art. In addition to being associated with a downstream channel frequency, a given program identifier is associated with a CMTS MAC domain identifier. The MAC identifier corresponds to the MAC domain of the CMTS device (e.g., CMTS blade) from which the given program is delivered. Furthermore, the program identifier is associated with a multicast address, such as an IP multicast address, that is unique to the program and its related packet streams. The association table may also associate a given program identifier with a downstream service identifier ("DSID") if DOCSIS 3.0 is used to deliver content to the subscriber.

While a subscriber/viewer is watching a video program, the association table resides in the CM for future use. If the viewer wants to watch different program, he or she may select a program using a familiar screen-based program guide. When the user selects a different program than the one currently being viewed, a new program identifier corresponding to the selected content is selected at step 115 at the CM device (a device that includes CM circuitry as well as other processing circuitry, which may be a set top box, or an IP television set top box). When the new program identifier is selected, a determination is made at step 120 whether a channel change will require terminating the current session between the CM and the CMTS and establishing a new session with a different MAC domain. If the determination result is that a new session does not need to be established, method 100 returns to step 115.

If, however, a determination is made at step 120 that the content selected by the user is not available from the MAC domain with which the CM device currently has an active session, method 100 follows the 'Y' path from step 120. At step 130, the CM informs the current MAC domain that the CM will terminate the current session. The CM terminates the current session by tuning to a new frequency at step 135. The new frequency to which the CM tunes at step 135 corresponds to the program identifier that is associated with the program identifier that was selected at step 115. It will be appreciated that since method 100 did not end following step 120, the new frequency is delivered from a different MAC domain.

As soon as the CM tunes to the downstream frequency that is associated with the selected program identifier in the association table, the CM device begins receiving the content corresponding to the program identifier selected by the subscriber at 115. Method 100 then returns to step 105 and the CM device registers with the new MAC domain. Since the process represented by registration step 105 may take a few seconds, the subscriber/viewer has already started receiving—and viewing—the selected before registration is completed. Accordingly, fast channel change, i.e., reduced time between selecting a new program and viewing the selected new program—is facilitated.

Figure 2:
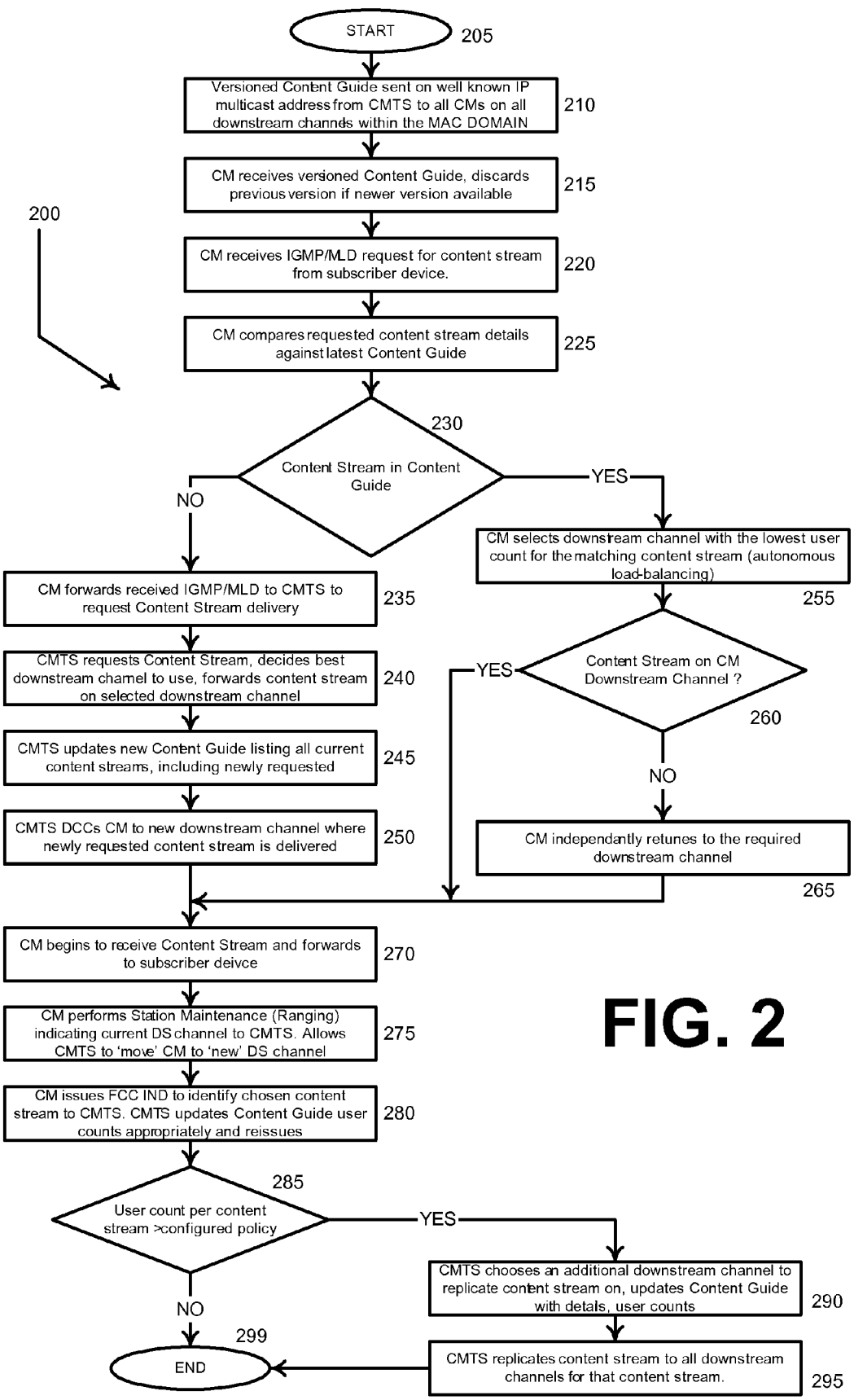
FIG. 2 illustrates a flow diagram of a method for facilitating fast channel change using content guide information.

Turning now to FIG. 2, another aspect is shown in a flow chart illustrating a method 200 for facilitating a fast channel change ("FCC") operation between program, or content, streams. After starting at step 205, a current version of program stream information is sent from a CMTS to cable modems at step 210 over the current downstream ("DS") channel to which the CM is tuned. The current program stream information is preferably sent using an IP multicast address, or other identifier, known to most, if not all, CMs over all the DS channels of the MAC domain that includes the current DS channel. The program stream information may include baseline priority interface ("BPI") key and payload header suppression ("PHS") information. In addition, the program stream information typically includes details of all active IP multicast identifier and tuning parameters associated with the IP multicast streams. The program stream information may be referred to as content guide information, or simply as a content guide. The content guide typically includes the names of a program, or programs, that is/are transported over all DS channels from the MAC domain that the CM is currently a member of. Each of these programs are associated with a stream identifier, typically an IP multicast address. In addition, the content guide includes the BPI keys and PHS information that are associated with the programs on the DS channel. After the CM receives the content guide/program stream information at step 210, the CM discards previously stored content guide information if the just-received information is a newer version and the content guide information is stored into the CM at step 215, typically into a memory, such as a RAM, flash memory or hard drive, or other memory device that may be used in cable modem/set top boxes.

At step 220, the CM receives an IGMP/MLD stream request for a content stream generated by a user/subscriber device such as, for example, a set top box, computer video game device, or other content device, which is typically coupled with and may or may not be integrated with the broadband device/CM. It will be appreciated that the user/subscriber device can access program information, for example, an electronic program guide ("EPG"), or a web page, that associates an IP multicast address of a program stream with corresponding programs from the EPG or web page. The IGMP/MLD stream request is generated from this association. Thus, when either the EPG or web page is displayed, the user selects a desired program there from, the subscriber device generates a stream request based on the multicast address of the stream that corresponds to the desired program and then forwards the stream request to the broadband device/CM. For purposes of discussion, program information relates to information stored and used at a subscriber device, such as an electronic program guide, as discussed above. Program information is distinguished herein from program stream information, which is also referred to as content guide information, or simply as a content guide as discussed above. Content guide information is received from the CMTS, and relates to program streams that are available over all DS channels from a given MAC domain. The content guide is typically used by a broadband device, such as a cable modem. At step 225, the CM compares details of the requested content stream with the content guide version stored in the CM. At step 230, a determination based on the comparison made at step 225 is made whether the content guide includes information associated with the requested program stream. If yes, the CM selects the downstream channel having the lowest user count for the content stream that matches the program desired by the user/subscriber. It will be appreciated that multiple downstream channels (each at a channel frequency) may carry the same multicast stream. An exemplary collection of content guide information is shown in FIG. 4.

In FIG. 4, content guide information 400 is shown in tabular form. Multicast details field 401 includes IP multicast address for each program stream, or related streams. DS channel ID field 402 includes the downstream channel ID number that corresponds to a unique QAM channel frequency. In the scenario shown, the same IP multicast stream is delivered by downstream channels 2 and 4. DS parameters field 403 includes multiple parameters associated with the corresponding downstream channel that are known in the art. PHS/BPI field 404 includes BPI key and PHS information for the associated IP multicast stream. Having this information available at the cable modem facilitates the cable modem locking to the associated IP multicast stream without having to request and receive the information from the CMTS, this reducing the time to switch between different streams. User_count field 405 includes the number of users that are receiving the associated IP multicast stream over the associated downstream channel. Reserved field 406 is reserved for future use.

Returning to the description of FIG. 2, a cable modem fulfilling a request from a user for the program associated with IP multicast 192.168.1.1/232.1.1.1 would select DS channel 4 at step 255 for load balancing purposes, because channel 4 is servicing 100 subscribers and channel 2 is servicing 150 subscribers, as shown in FIG. 4. This is an advantage; by using the CM to handle load balancing, upstream bandwidth is not used for load balancing messaging nor are CMTS processor resources used. Furthermore, as interest in a given program wanes, multiple DS channels may no longer be needed to deliver the same stream. Thus, the CMTS can use the updated content guide user_count values to instruct, via DCC, cable modems to tune to another DS frequency that is delivering a stream to which the CM is currently locked. Before issuing the DCC message(s) instructing CM to tune to another DS channel to continue receiving the stream they are currently receiving, the CMTS may also update the content guide to remove an association between a given stream and a particular channel, thus preventing other CMs from tuning to the particular channel to lock to a requested stream.

Continuing with the description of FIG. 2, the CM determines at step 260 whether the channel selected at step 255 is the currently tuned channel. If not, the CM tunes to the selected channel that carries the desired program stream at step 265. If at step 260 a determination is made that the currently tuned downstream channel is the channel that carries the desired program stream, method 200 advances to step 270.

Returning to describing the determination at step 230, if the desired program stream is not included in the current content guide information (this scenario could occur when a user manually selects a channel number not knowing what program content is provided thereon) the CM forwards to the CMTS at step 235 the IGMP/MLD request received from the subscriber device at step 220. In response, the CMTS requests at step 240 the desired program stream from a content supplier, such as, for example, a video server or video farm, if such stream is available. At step 245, the CMTS updates a new version of the content guide with a listing of all the current content streams available from the CMTS, including newly requested streams. At step 250, the CMTS sends a DCC message to the CM that requested the content that was not previously included in the content guide, thereby instructing the CM to tune to the downstream channel over which the newly requested content is available. This DCC message will typically only be sent if the requesting CM is not on the same DS channel on which the newly requested content is available.

Arriving at step 270 from either step 250 or 265, the CM begins receiving the desired content/program stream and forwards the packets, or other information units, to the subscriber device(s) (e.g., television, set top box, computer, etc.). At step 275, the CM performs station maintenance, which typically includes ranging to inform the CMTS of the downstream channel to which the CM is tuned. After the CM has ranged, the CM issues a fast channel change indicator message (FCC_Ind) to the CMTS at step 280. The FCC_Ind message is used by the CMTS to update channel guide information 400 (shown in FIG. 4) with the current number of subscriber units locked to a given IP multicast stream.

At step 285, a determination is made whether the user count for a given content stream over a particular downstream channel exceeds a predetermined number. If the determination is yes, a condition which may be referred to as an oversubscribed condition, the CMTS chooses at step 290 an additional downstream channel over which to send the oversubscribed stream. The CMTS updates the content guide information with the multicast stream details corresponding to the additional downstream channel in field 401 shown in FIG. 4 and with the user count information in field 405. Continuing with description of FIG. 2, the CMTS replicates the previously oversubscribed content stream to all downstream channels corresponding to that content stream at step 295. Method 200 ends at step 299 following either step 295, or a 'no' result from the determination at step 285.

Figure 3:
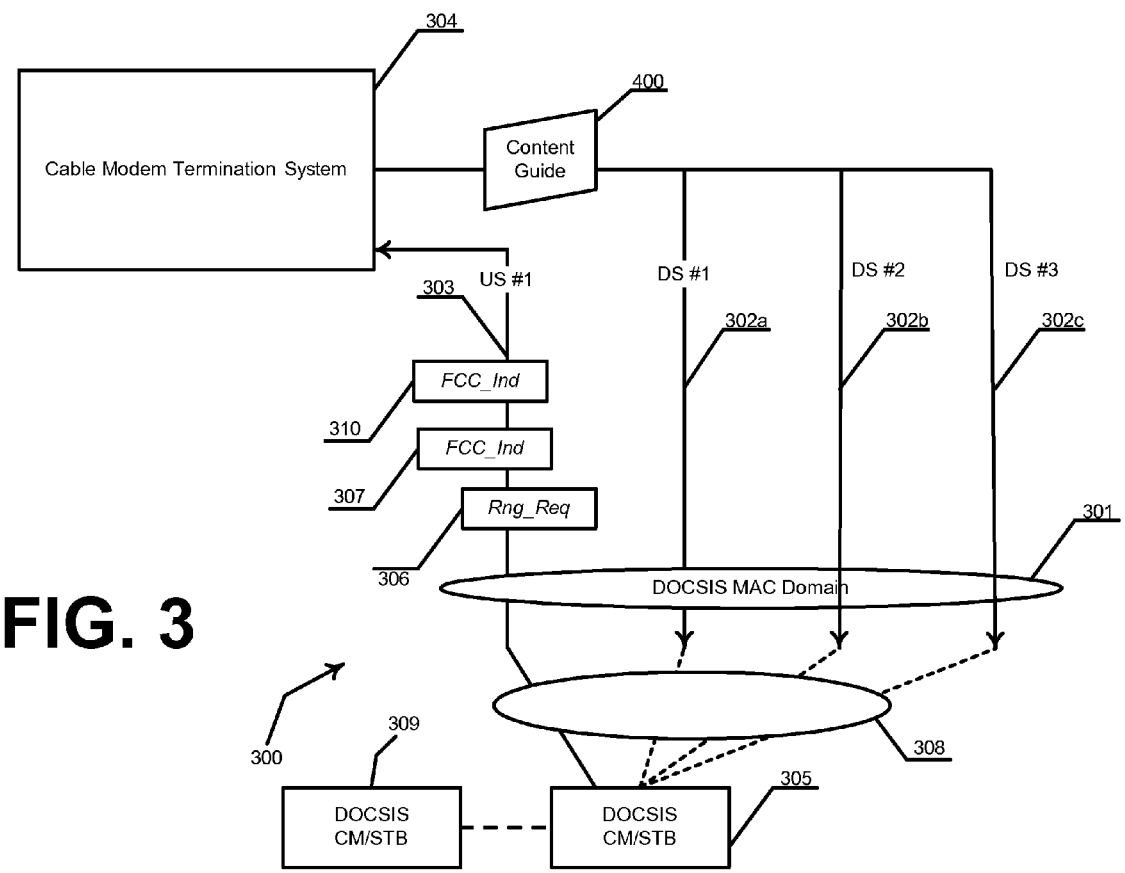
FIG. 3 illustrates a system diagram of information flow between the CMTS and cable modems.

Turning now to FIG. 3, the figure illustrates a system 300 related to MAC domain 301. As known in the art, MAC domain 301 includes at least one downstream channel 302 and at least one upstream channel 303. MAC domain 301 is typically associated with downstream channels 302 and upstream channels 303 at CMTS 304. CMTS 304 communicates with cable modems and/or set top boxes 305 over the upstream and downstream channels via links 308, which may comprise an HFC network. It will be appreciated as discussed above, that the broadband device, typically a cable modem device, and the user/subscriber device(s) may be separate devices or may be integrated into one device. The broadband device and subscriber device are shown integrated into a single device for simplicity in the drawing. However, an alternative embodiment shows user device 309 coupled to the broadband device 305 by a broken line. Content guide information 400, as referenced in FIG. 4, is transmitted downstream over downstream channels 302 of MAC domain 301 when new versions are generated, as discussed above.

Range request ("Rng_Req") message 306 is sent periodically at predetermined intervals per DOCSIS as known in the art. An example Rng_Req period is 30 seconds, but other periods can be and are used in the field too. FCC_Ind message 307 may be sent after rng_Req 306 may be sent after a change in program stream to indicate to the CMTS 304 that CM 305 is receiving a different multicast stream. CMTS 304 uses the FCC_Ind information to increase the count for given stream on a given stream to which CM 305 has just locked as discussed above, and to decrease the count for a given stream to which the CM has just released. Optionally, FCC_Ind_Start message 310 may be sent to inform CMTS 304 that CM 305 will be undertaking fast channel change. CMTS 304 can use FCC_Ind_Start to avoid generating an 'offline' message related to CM 305 if a Rng_Req message is not received during one or more ranging opportunities set aside by the CMTS to receive Rng_Req messages specifically from CM 305. This can be useful in a scenario where a subscriber begins 'channel surfing' programming channels wherein CM/STB 305 does not stay locked to a particular multicast stream for very long (for example, the period that Rng_Req message from CM 305 are expected by CMTS 304). This prevents frequent upstream transmissions of multiple FCC_Ind messages 307 as each new channel is evaluated by the subscriber. In addition, updating of content guide information within CMTS 304 as each new channel is evaluated is reduced, as is the actual downstream transmission of new versions of content guide information 400 is reduced.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

What is claimed is:

1. A method for selecting from among a plurality of program streams delivered from a CMTS, comprising:
    locking the broadband device to a first downstream channel in a first MAC domain;
    receiving program stream information for each of the plurality of multicast program streams available at a broadband device, the multicast program streams being available on one or more channels received by the broadband device, the program stream information comprising information about which of a plurality of downstream channels includes a particular multicast program stream;
    storing the program stream information in a memory at the broadband device;
    displaying program information associated with available multicast programs;
    selecting a desired multicast program from the displayed program information;
    comparing the received program stream information with details of the selected multicast program;
    if it is determined that the received program stream information includes information associated with the selected multicast program, generating a local stream request to a broadband device that includes program information corresponding to the desired multicast program, and locking the broadband device to a new downstream channel associated with the desired multicast program stream corresponding to the local stream request without issuing a channel change request to a headend device;
    and if it is determined that the program stream information does not include information associated with the selected multicast program, requesting from the head end the selected multicast program, informing the CMTS of the new downstream channel to which the broadband device is currently tuned, and informing the CMTS of the current multicast program stream to which the broadband device is locked.

2. The method of claim 1 wherein the plurality of program streams are delivered from a single MAC domain.

3. The method of claim 1 wherein stream information for each of the plurality of program streams includes BPI and PHS information corresponding to the respective stream.

4. The method of claim 1 wherein locking includes tuning to a different channel frequency.

5. The method of claim 4 wherein the stream information composes a content guide corresponding to the downstream channel to which the CM is tuned.

6. The method of claim 5 wherein a desired program stream is an IP multicast stream.

7. The method of claim 6 wherein the content guide includes a list of IP multicast streams available on the corresponding downstream channel.

8. The method of claim 1 further comprising receiving updated content guide information that includes a new downstream frequency and program stream identifier for the stream to which the user device is locked.

9. The method of claim 1 wherein the program information includes an electronic program guide.

10. The method of claim 1 wherein the program information includes a web page.

11. A method for selecting from among a plurality of program streams delivered from a CMTS, comprising:
    transmitting program stream information for each of the plurality of program streams to a broadband device associated with a first downstream channel to which the broadband device is tuned,
    receiving from the broadband device information of a second downstream channel to which the broadband device is currently tuned;
    receiving from the broadband device information of the current program stream to which the broadband device is locked; and
    updating, based on the information of the current program streams received from one or more broadband devices, a user count to reflect the number of subscribers that are locked to each of the plurality of streams; and
    wherein if it is determined by the broadband device that information associated with the content on the second downstream channel is contained in the program stream information, the information of the second downstream channel to which the broadband device is currently tuned is received without receiving a channel change request from the broadband device, and wherein if it is determined by the broadband device that information associated with the content on the second downstream channel is not contained in the program stream information, the information of the second downstream channel to which the broadband device is currently tuned is received after receiving a channel change request from the broadband device.

12. The method of claim 11 wherein the plurality of program streams are transmitted from a single MAC domain.

13. The method of claim 11 wherein stream information for each of the plurality of program streams includes BPI and PHS information corresponding to the respective stream.

14. The method of claim 11 wherein locking includes a broadband device tuning to a different channel frequency.

15. The method of claim 14 wherein the stream information composes a content guide corresponding to the downstream channel to which the broadband device is tuned.

16. The method of claim 15 wherein a desired program stream is an IP multicast stream.

17. The method of claim 16 wherein the content guide includes a list of IP multicast streams available on the corresponding downstream channel.

18. The method of claim 11 further comprising transmitting updated content guide information that includes a new downstream frequency associated with the program stream identifier for the stream to which the broadband device is locked.

19. The method of claim 18 further comprising transmitting a DCC message instructing one or more broadband devices to tune to a different channel frequency to continue receiving the program stream they are currently receiving.

20. A system for selecting from among a plurality of program streams delivered from a CMTS, comprising:
    means for receiving program stream information for each of the plurality of program streams at a broadband device,
    means for storing the program stream information at the broadband device;
    means for displaying program information;
    means for selecting a desired program from the displayed program information;
    means for comparing the received program stream information with details of the selected program;
    means for generating a local stream request to a cable modem that includes program information corresponding to the desired program;
    means for locking the broadband device to the desired program stream that corresponds to the stream request without transmitting a channel change request to a headend device if it is determined that the received program stream information includes information associated with the selected multicast program;
    means for requesting the selected program from a head end device if it is determined that the program stream information does not include information associated with the selected program;
    means for informing the CMTS of the current downstream channel to which the broadband device is currently tuned;
    means for informing the CMTS of the current program stream to which the broadband device is locked.

* * * * *